United States Patent [19]

Buckwalter

[11] 4,287,000

[45] Sep. 1, 1981

[54] GRINDING OF PIGMENTS

[75] Inventor: Geoffrey R. Buckwalter, Flemington, N.J.

[73] Assignee: Eric Simon, Houston, Tex.

[21] Appl. No.: 106,410

[22] Filed: Dec. 26, 1979

[51] Int. Cl.$^3$ ............................................... C04B 47/04
[52] U.S. Cl. ..................................................... 106/309
[58] Field of Search ......................................... 106/309

[56] References Cited

U.S. PATENT DOCUMENTS

| 2,723,981 | 11/1955 | Tullsen | 106/309 |
| 2,982,666 | 5/1961 | Chun et al. | 106/309 |
| 3,523,030 | 8/1970 | Malin et al. | 106/309 |
| 3,936,315 | 2/1976 | Ferrill et al. | 106/309 |
| 4,196,016 | 4/1980 | Simon | 106/309 |

*Primary Examiner*—James Poer
*Attorney, Agent, or Firm*—Bertram H. Mann

[57] ABSTRACT

A method of salt grinding of pigments wherein the material to be ground is milled with a salt, an organic conditioner, and larger particles such as balls, nails, or in a strong kneader for comminuting the pigment to the desired state of subdivision. This grinding mass is made into a smooth flowing suspension by addition of more organic conditioning agent rather than solvents, as heretofore. The suspension is then passed through a decanter type centrifuge resulting in a sediment fraction containing most of the salt, some pigment, and some organic conditioning agent, and a liquid fraction containing most of the pigment, some salt and conditioning agent. The sediment portion is returned to the grinding mechanism where it is combined with a new batch of unmilled pigment for a subsequent milling cycle, while the pigment is separated by filtration from the liquid portion after some addition of water and flocculating agents. The filtration and wash liquors are combined. After evaporation, these liquors are then used for thinning out of the milling mass of a subsequent batch.

6 Claims, No Drawings

GRINDING OF PIGMENTS

BACKGROUND OF THE INVENTION

1. Field of the Invention

This invention relates to an improvement of the salt grinding process of pigments which is used to enhance the pigmentary qualities of coloring matters. This invention provides procedures for economic recovery of the grinding aids such as salts and the organic conditioning agents, thereby improving the economy of the salt grinding process and reducing pollution.

2. Description of Prior Art

It is known from prior art including co-pending application Ser. No. 856,175 filed Nov. 30, 1977, now U.S. Pat. No. 4,196,016, by Eric Simon, assignee of the present application, that solids such as pigments may be finely divided by the salt milling technique in which the pigment is ground with salts and organic conditioning agents in the proper milling equipment until the desired state of pigmentary quality is obtained.

The following salts have been mentioned in the literature for use in the process either alone or in mixtures: sodium chloride, potassium chloride, sodium sulfate, aluminum sulfate, zinc chloride, aluminum chloride, calcium carbonate, barium sulfate, sodium acetate, sodium carbonate, calcium chloride, sodium tartrate, potassium acetate, sodium citrate.

Conditioning agents previously disclosed either alone or in mixtures are: ethylene Glycol, diethylene Glycol, triethylene glycol, propylene glycol, polyethylene glycols, glycerine, ethanolamines, phenols, aniline, monoester and monoether of ethylene, glycols and propyleneglycols, polyethylene amines, N alkyl and N hydroxylakyl polyethylene imines, N mono and N disubstituted anilines, silicon oils, morpholine, dimethysulfoxide, polyglycolamines, nitrobenzene, hydrocarbons and chlorinated hydrocarbons boiling between 60°-220° C., diphenyl, dimethylnaphthalene, dichlorobenzene, and hexylene glycol.

The pigments mentioned in the literature which are improved through salt grinding are: metal free or metal phthalocyanines, particularly the copper, nickel, cobalt, zinc, aluminum, tin and manganese phthalocyanines, halogenated phthalocyanines, particularly the chlorinated and brominated types, quinacridons, carbazole violet, and vat pigments.

The grinding mills can be heavy dough mixers with viscous or plastic milling and heavy shear, balls mills with steel balls, iron nails and other heavy grinding media, vibratory mills, etc.

There is considerable patent literature describing the salt grinding process of pigments with variations in mill charges and types of mills employed, but basically the charges consist of:

a. the pigment to be improved;

b. water soluble salts of various compositions and physical states or mixtures of them;

c. organic treating agent which is either water soluble in neutral, alkaline, or acid solutions;

d. other additives.

After several hours of grinding, an optimum pigment is obtained after which the entire mass is charged into large quantities of water or water containing some alkali or acid. The salts and organic conditioning agents enter into solution while the pigment remains as a solid in a fine suspension. After additional proprietary treatments, the pigment is separated by filtration and the liquors containing the salt and organic treating agents enter the effluent streams with subsequent environmental problems. Some of the organic treating agents mentioned in the prior art are actually poisonous. As described in the previous processes, the salts and organic treating agents are in such a dilute state that an economic recovery is not possible.

The literature mentions a great variation in the proportions of salts and organic treating agents per pigment. They vary about as follows:

1 part pigment
0.5-1.5 parts of organic treating agent
4-10 parts of salt
additional modifying agents or mixtures of treating agents.

The above mentioned patent application Ser. No. 856,175 describes a procedure whereby the pigments such as phthalocyanines can be conditioned to optimum pigmentary quality by salt grinding with sodium chloride or other normally used salts and organic conditioners. When the desired state of subdivision is reached, the milled material is dispersed in an organic liquid which is a solvent for the conditioner but which is unreactive towards the grinding aid or the pigment and will dissolve only minimal quantities of the salt. The resulting suspension consists of:

1. a solid phase made up of finely divided pigment and salt and 2. a liquid phase made of conditioning agent, solvent and some other dissolved matter.

This suspension is then passed through a decanter type centrifuge resulting in the following fractions:

1. a sediment portion containing most of the salt, some pigment, some solvent and possibly some conditioning agent, and 2. a liquid fraction containing the major portion of the pigment charged, most of the conditioning agent, most of the solvent, and possibly some salt.

The principle of centrifugal separation of the major portion of the salt from the major portion of the pigment is well explained in the application Ser. No. 856,175.

The sediment portion is returned to the milling equipment, the solvent is stripped off for recovery, and more crude pigment and recovered conditioning agent are added. This composition is now ready for the next milling cycle.

The liquid fraction is filtered, washed with additional solvent free of conditioning agent and then with water, if soluble salts are present. The filtration liquor and wash liquors are sent to an evaporator where solvent is distilled off leaving the conditioning agent for use in the next grinding cycle.

The wash water containing solvent is stripped free of solvent for use of the solvent in the subsequent cycle.

The recovered solvents are then combined to be used for the subsequent dispersion steps of the milled mass.

SUMMARY OF THE PRESENT INVENTION

It has now been found that the solvent or dilution liquid used in the above dispersion of the milled mass can be eliminated by addition of more organic conditioning liquid after the milling step until a smooth suspension is obtained.

DESCRIPTION OF PREFERRED EMBODIMENTS

The process is as follows:

1. Charge crude unfinished pigment, salt and conditioning agent into the proper milling equipment.
2. Continue grinding or kneading until the desired pigmentary properties are reached.
3. Charge the ground mass into a dispersion tank containing sufficient conditioning agent to make a smooth suspension with the proper viscosity for good centrifugal separation. The viscosity properties can also be adjusted with temperature.
4. Run this suspension through a decanter type centrifuge where the following fractions are separated.
   a. A sediment consisting of most of the salt from the grinding mass, some pigment and conditioning agent. This sediment has the proper consistency to be returned to the milling equipment for the next kneading cycle without additional treatment.
   b. A liquid suspension containing most of the pigment and conditioning agent and some salt.
5. The sediment is returned to the milling equipment, new crude pigment added for the next milling cycle.
6. The pigment is separated from the liquid suspension by addition of some water and flocculating agent to improve filtration properties. The pigment is then filtered, washed with water free of salt and conditioning agent. The presscake can then be processed normally such as for flushing, dry color, water dispersions, textile printing compositions, non-aqueous dispersions, etc.
7. The filtrate plus the wash waters are then combined and sent to an evaporator where the water is driven off, leaving some salt and conditioning agent which is then used for the dispersion medium in step 3.

The above described invention provides for the economic recovery of practically all of the salt and conditioning agent which, in the art prior to patent application Ser. No. 856,175, were lost to the effluent streams thus contributing to the pollution problems.

Thus this invention improves the economics of the salt grinding process in that most of the salt and conditioning agents are recovered while simultaneously reducing pollution of the environment.

In said co-pending application No. 856,175 solvents which are compatible with the conditioning agent are used to prepare the proper dispersion for good centrifugal separation in the decanter type centrifuge. But many of the solvents mentioned have low flash points and therefore the process would have to be carried in explosion proof plants which would require explosion proof equipment and other high installation costs.

Thus the newly described invention can be adapted to existing plant equipment. In addition, it simplifies the operation over said application Ser. No. 856,175 in that the latter adds an additional component—namely the solvent—into the process which will have to be handled separately in the recovery steps.

Thus, in summary, the improvements in this invention over pending application Ser. No. 856,175 are:

1. No additional organic component is added to the system and therefore will not have to be recovered separately. The process will therefore be considerably simpler with less equipment cost.
2. Since most of the conditioning agents have high flash points, the operation can be carried out in normal factory installations without expensive explosion proof equipment.
3. Since no liquids are used with low flash points, the process will be far safer.
4. In the process of the co-pending application Ser. No. 856,175, the sediment contains some dispersion solvent which will have to be flashed off in the milling equipment. This will require closed explosion proof milling equipment with solvent recovery condensers and collectors. By using the conditioning agent as a dispersing liquid, normal milling equipment can be employed.

This invention will be further illustrated by the following examples:

EXAMPLE 1

1. Into a 300 gallon Baker-Perkins kneader provided with sigma blades, charge
   - 300 pounds of crude copper phthalocyanine blue with a minimum of 93% purity
   - 2400 pounds of sodium chloride of which at least 95% passes through a 325 mesh screen
   - 480 pounds of diethylene glycol
2. Knead 9 hours in the kneading equipment at 75°–80° C.
3. To a tank fitted with a dispersion type agitator and containing
   - 1900 pounds of diethylene glycol add the mass from the milling equipment. Agitation is continued until a smooth free flowing suspension is obtained with no lumps.
4. This suspension is then passed through a decanter type centrifuge where the following fractions are separated:
   a. a solid sediment consisting of 79% salt, 1.7% pigment and 19% diethylene glycol, and
   b. a liquid fraction consisting of finely divided pigment, some salt and diethylene glycol.
5. The solid fraction is returned to the kneader. Additional crude phthalocyanine blue is added. The viscosity is adjusted for optimum kneading. The mass is now ready for the next grinding cycle with the recovered salt.
6. To 100 parts of the liquid fraction 30 parts of water are added and 1 part of flocculating agent. The pigment is then separated by filtration. The presscake is washed free of diethylene glycol and salts with water.
7. The filtration liquor and wash waters are combined and sent to an evaporation unit where the water will be driven off. The bottoms will consist of diethylene glycol and salt which will be used for the dispersion step 3.

The presscake obtained in step 6 can be worked up in various proprietary methods described in the literature, such as into a flush, dry color, water dispersion, textile printing composition, non-aqueous dispersion, etc.

In returning the solid fraction to the kneader in step 5, an additional discovery was made, namely that the recovered salt is now a more efficient grinding medium than the original commercial product. In the original grinding composition a salt/pigment ratio of 8 to 1 was required to obtain optimum pigment properties. It has now been found that with the recovered salt, only 5 parts of salt were required per part of pigment for good pigment properties.

Not only was a saving in salt obtained, but the capacity of the kneader increased by 50% in pigment production, since the reduced salt volume could be replaced by higher pigment loading. This is a very important saving since the kneader is a very costly piece of equipment and energy intensive. Thus a greater output per unit with energy savings has been achieved.

EXAMPLE 2

Same procedure as in example 1 except that the conditioning agent is a mixture of triethylene glycol and tetraethylene glycol.

EXAMPLE 3

Same procedure as in example 2 except that the mass is heated to 175° F. before centrifugal separation.

This invention may be otherwise modified as will occur to those skilled in the art and the exclusive use of all modifications as come within the scope of the appended claims is contemplated.

What is claimed is:

1. In salt grinding of pigments, the improvement comprising
    (a) milling oversize crude organic pigment with an inorganic salt and an organic conditioner until a predetermined state of pigmentary quality is obtained;
    (b) dispersion of the above mixture in a dispersing medium to provide a smooth suspension;
    (c) separating the resulting suspension into a liquid phase consisting of properly sized pigment, conditioner, and some salt and a sediment phase comprising the major portion of the salt, conditioner, and a small part of the pigment;
    (d) returning the sediment phase to step a for a subsequent batch in a new grinding cycle with new unfinished pigment;
    (e) separating the pigment from said liquid phase by filtration after addition of some water and flocculating agent to form press cake;
    (f) washing the resulting press cake free of conditioning agent and salt with water; and
    (g) combining filtration liquor from step e and wash water from step f and evaporating the water from the conditioning agent leaving a mass of conditioning agent and some salt in the unit;

wherein organic conditioner is used as the dispersing medium in step b.

2. The process of claim 1 wherein the pigment of claim 1 is a copper phthalocyanine.

3. The process of claim 1 wherein the conditioning agent employed for the grinding and dispersion step is an ethylene glycol, polyethylene glycol, or a mixture of these glycols.

4. The process of claim 1 wherein the separation of step (c) into a liquid phase and a sediment phase is accomplished by a decanter type centrifuge.

5. The process of claim 1 wherein the mass of (b) is heated before passing through a decanter type centrifuge.

6. The process of claim 1 wherein the dispersing medium is the mass resultant from step g.

* * * * *